US008793572B2

(12) United States Patent
Grams

(10) Patent No.: US 8,793,572 B2
(45) Date of Patent: Jul. 29, 2014

(54) POSITIONING GRAPHICAL OBJECTS WITHIN PREVIOUSLY FORMATTED TEXT

(75) Inventor: Jason James Grams, Broomfield, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 78 days.

(21) Appl. No.: 13/174,553

(22) Filed: Jun. 30, 2011

(65) Prior Publication Data
US 2013/0007601 A1    Jan. 3, 2013

(51) Int. Cl.
*G06F 17/00* (2006.01)

(52) U.S. Cl.
USPC .......................................... 715/247; 715/243

(58) Field of Classification Search
USPC .......................................... 715/243, 200, 247
See application file for complete search history.

(56) References Cited

U.S. PATENT DOCUMENTS

| 4,829,470 | A  | * | 5/1989  | Wang ............................ 715/234 |
| 5,214,755 | A  | * | 5/1993  | Mason .......................... 715/209 |
| 6,209,010 | B1 | * | 3/2001  | Gauthier et al. ............. 715/234 |
| 7,030,890 | B1 |   | 4/2006  | Jouet et al. |
| 7,385,531 | B2 |   | 6/2008  | Zhang |
| 7,716,578 | B2 |   | 5/2010  | Theophil et al. |
| 7,757,179 | B2 |   | 7/2010  | Theophil et al. |
| 7,788,634 | B2 |   | 8/2010  | Acott et al. |
| 2005/0144566 | A1 |   | 6/2005  | Zhang |
| 2005/0162395 | A1 |   | 7/2005  | Unruh |
| 2006/0053443 | A1 |   | 3/2006  | Acott et al. |
| 2006/0103667 | A1 |   | 5/2006  | Amit et al. |
| 2008/0072165 | A1 |   | 3/2008  | Theophil et al. |
| 2009/0100374 | A1 |   | 4/2009  | Sheasby et al. |
| 2009/0319888 | A1 | * | 12/2009 | Oygard ......................... 715/252 |
| 2011/0179345 | A1 | * | 7/2011  | Capela et al. ................. 715/209 |
| 2011/0179350 | A1 | * | 7/2011  | Capela et al. ................. 715/244 |

* cited by examiner

*Primary Examiner* — Manglesh M Patel
(74) *Attorney, Agent, or Firm* — Osha Liang LLP

(57) ABSTRACT

A method for rendering a page, including: obtaining an electronic document comprising a text stream and an anchor corresponding to a graphical object and specifying a first displacement of the graphical object relative to the anchor; placing the text stream within a region of the page; identifying a first location on the page corresponding to the anchor; calculating an area on the page for placing the graphical object; marking the graphical object as pinned; initiating a second layout of the page; placing the text stream on the page by wrapping a portion of the text stream around the area; identifying a second location on the page corresponding to the anchor, where the second position and the area are separated by a second displacement distinct from the first displacement; and outputting the page with at least the portion of the text stream and with the graphical object occupying the area.

20 Claims, 9 Drawing Sheets

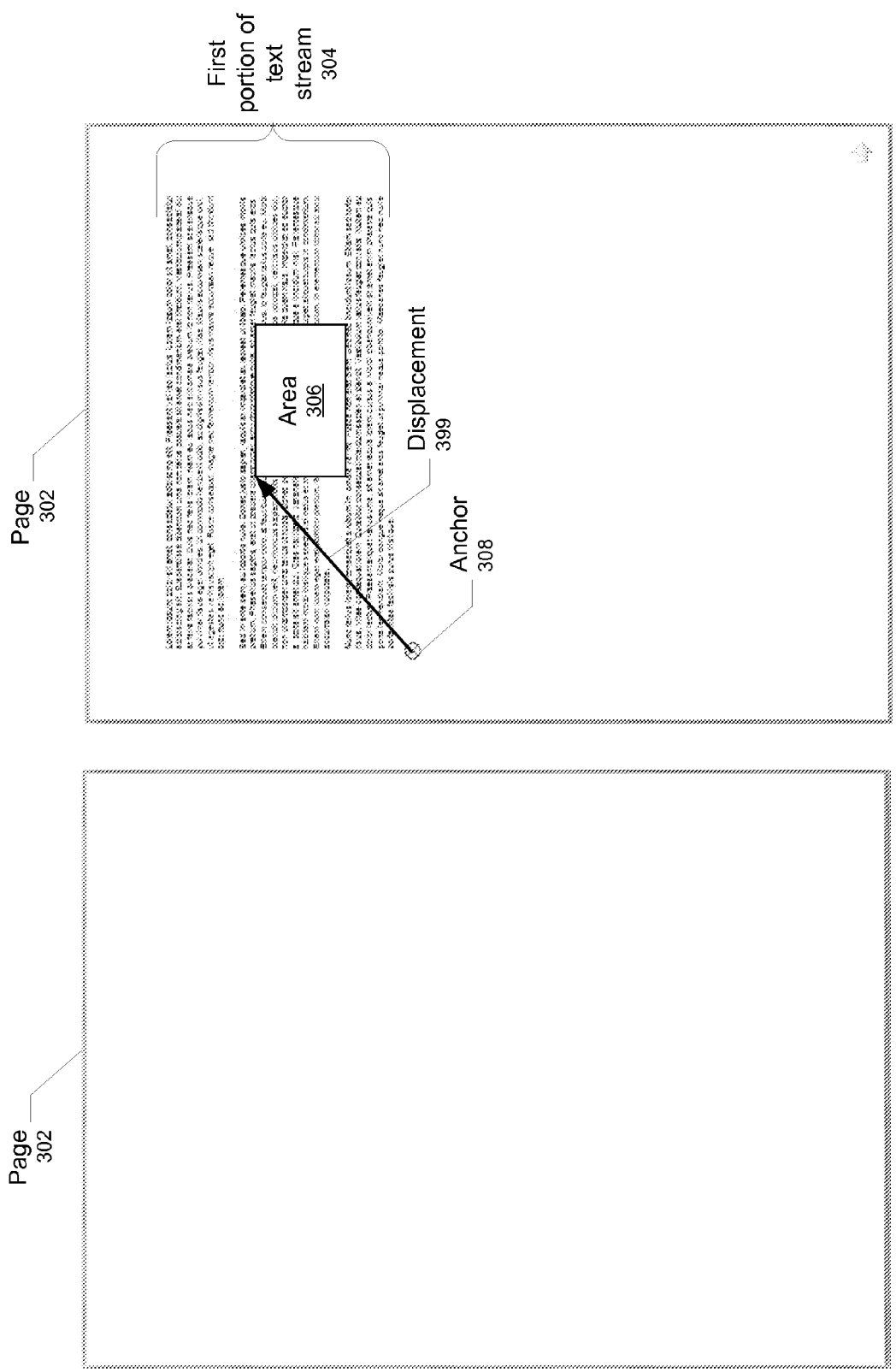

Current Page
402

Lorem ipsum dolor sit amet, consectetur adipiscing elit. Cras dapibus leo sit amet arcu accumsan non fermentum quam fringilla. Maecenas odio leo, suscipit eget iaculis sed, luctus vel turpis. Nullam porta gravida mi, ac iaculis arcu rutrum venenatis. Nulla sit amet nulla ut felis posuere varius. Aenean iaculis eros et odio pretium blandit convallis sapien blandit. Quisque purus quam, luctus in posuere quis, vestibulum in quam. Duis sed odio neque. Cras cuismod, velit ac porttitor blandit, orci massa pulvinar nisl, at sollicitudin quam lacus eu quam. Donec convallis dictum ante at varius. Aliquam convallis diam nisi, non pretium risus. Suspendisse et mattis nunc. Praesent eget turpis eu nisl tincidunt aliquam. Cras quis vestibulum leo. Curabitur vehicula, quam ut malesuada consectetur, massa ligula consectetur eros, in tincidunt odio ipsum non dui. Fusce egestas, felis quis eleifend Lorem ipsum dolor sit amet, consectetur adipiscing elit. Cras dapibus leo sit amet arcu accumsan non fermentum quam fringilla. Maecenas odio leo, suscipit eget iaculis sed, luctus vel turpis. Nullam porta gravida mi, ac iaculis arcu rutrum venenatis. Nulla sit amet nulla ut felis posuere varius. Aenean iaculis eros et odio pretium blandit convallis sapien blandit.

Elephants are huge animals. Even they are powerful. How much doe tall, wide, and long is an average Giraffes can run. I saw a giraffe a giraffe was much taller than the el giraffes are naturally friendly to ca the giraffe and the elephant could dialogue, but it is easier to read th accustomed to hot weather, which high these days.

Area
408

Text Stream
404

Anchor
412

Displacement
499

FIG. 4A

Current Page
402

Lorem ipsum dolor sit amet, consectetur adipiscing elit. Cras dapibus leo sit amet arcu accumsan non fermentum quam fringilla. Maecenas odio leo, suscipit eget iaculis sed, luctus vel turpis. Nullam porta gravida mi, ac iaculis arcu rutrum venenatis. Nulla sit amet nulla ut felis posuere varius. Aenean iaculis eros et odio pretium blandit convallis sapien blandit. Quisque purus quam, luctus in posuere quis, vestibulum in quam. Duis sed odio neque. Cras euismod, velit ac porttitor blandit, orci massa pulvinar nisl, at sollicitudin quam lacus eu quam. Donec convallis dictum ante at varius. Aliquam convallis diam nisi, non pretium risus. Suspendisse et mattis nunc. Praesent eget turpis eu nisl tincidunt aliquam. Cras quis vestibulum leo. Curabitur vehicula, quam ut malesuada consectetur, massa ligula consectetur eros, in tincidunt odio ipsum non dui. Fusce egestas, felis quis eleifend Lorem ipsum dolor sit amet, consectetur adipiscing elit. Cras dapibus leo sit amet arcu accumsan non fermentum quam fringilla. Maecenas odio leo, suscipit eget iaculis sed, luctus vel turpis. Nullam porta gravida mi, ac iaculis arcu rutrum venenatis. Nulla sit amet nulla ut felis posuere varius. Aenean iaculis eros et odio pretium blandit convallis sapien blandit.

Elephants are huge animals. Even though the elephants move slowly, they are powerful. How much does an average elephant weigh? How tall, wide, and long is an average elephant? I like giraffes, too. Giraffes can run. I saw a giraffe and an elephant in a movie once. The giraffe was much taller than the elephant. I wonder if elephants and giraffes are naturally

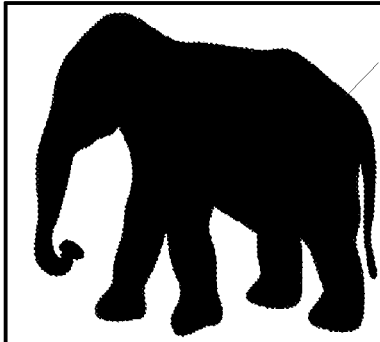

Graphical Object
418

Area
408

Text Stream Segment A
406

FIG. 4B

POSITIONING GRAPHICAL OBJECTS WITHIN PREVIOUSLY FORMATTED TEXT

BACKGROUND

An electronic document (ED) may include any number of text streams and any number of graphical objects (i.e., clipart, photographs, drawings, etc.). The ED may also include anchors for positioning the one or more graphical objects. Specifically, each anchor corresponds to a graphical object and each anchor dictates the position (i.e., displacement) of its graphical object relative to itself. Anchors may be specified before, after, or within text streams, and like text characters, anchors are positioned on a page during a rendering of the ED. However, unlike text characters, anchors are generally not visible to the reader of the ED and text and/or graphics may be placed on top of the anchor. Once an anchor is placed on the page, the position of the anchor's graphical object can be calculated based on the displacement specified by the anchor. It is the responsibility of a layout engine on a Page Rendering Device (PRD) or user machine to layout the text streams, anchors, and graphical objects on the page as specified by the ED.

In general, a page is rendered serially. Accordingly, when an anchor is positioned and the anchor specifies a positive displacement, the calculated position of the corresponding graphical object is located on a part of the page which is still blank. However, when an anchor is positioned and the anchor specifies a negative displacement, the calculated position of the corresponding graphical object is often located on a part of the page which is already occupied (e.g., by text or other graphical objects) and an overlap situation exists. Despite the extra processing that results from overlap situations, users still like creating EDs having anchors specifying negative displacements.

SUMMARY OF INVENTION

In general, in one aspect, the invention relates to a method for rendering a page. The method comprises: obtaining an electronic document comprising a text stream and an anchor corresponding to a graphical object and specifying a first displacement of the graphical object relative to the anchor; placing, during a first layout of a page, the text stream within a region of the page; identifying, during the first layout, a first location on the page corresponding to the anchor; calculating, based on the first location and the first displacement, an area on the page for placing the graphical object; marking, during the first layout and in response to the region overlapping the area, the graphical object as pinned; initiating, in response to the region overlapping the area, a second layout of the page; placing, during the second layout, the text stream on the page by wrapping a portion of the text stream around the area; identifying, during the second layout, a second location on the page corresponding to the anchor, where the second position and the area are separated by a second displacement distinct from the first displacement; and outputting, in response to identifying the second location and in response to designating the graphical object as pinned, the page with at least the portion of the text stream and with the graphical object occupying the area.

In general, in one aspect, the invention relates to system for rendering a page. The system comprises a hardware processor and a layout engine executing on the hardware processor and configured to: obtain an electronic document comprising a text stream and an anchor corresponding to a graphical object and specifying a first displacement of the graphical object relative to the anchor; place, during a first layout of a first page, the text stream within a region of the first page; identify, during the first layout, a location on the first page corresponding to the anchor; calculate, based on the location and the displacement, an area on the first page for placing the graphical object; mark, during the first layout and in response to the region overlapping the area, the graphical object as pinned; initiate, in response to the region overlapping the area, a second layout of the page; place, during the second layout, the text stream on the page by wrapping a portion of the text stream around the area; identify, during the second layout, a second location on the page corresponding to the anchor, wherein the second position and the area are separated by a second displacement distinct from the first displacement; ignore, during the second layout, the anchor in response to designating the graphical object as pinned; and output, after the second layout, the page with the text stream and with the graphical object occupying the area.

In general, in one aspect, the invention relates to a non-transitory computer readable storage medium storing computer readable program code embodied therein for performing a method of rendering a page. The method comprises: obtaining an electronic document comprising a text stream and an anchor corresponding to a graphical object and specifying a first displacement of the graphical object relative to the anchor; placing, during a first layout of a page, the text stream within a region of the page; identifying, during the first layout, a first location on the page corresponding to the anchor; calculating, based on the first location and the first displacement, an area on the page for placing the graphical object; marking, during the first layout and in response to the region overlapping the area, the graphical object as pinned; initiating, in response to the region overlapping the area, a second layout of the page; placing, during the second layout, the text stream on the page by wrapping a portion of the text stream around the area; identifying, during the second layout, a second location on the page corresponding to the anchor, wherein the second position and the area are separated by a second displacement distinct from the first displacement; and outputting, in response to identifying the second location and in response to designating the graphical object as pinned, the page with at least the portion of the text stream and with the graphical object occupying the area.

Other aspects of the invention will be apparent from the following description and the appended claims.

DETAILED DESCRIPTION

Figure 1:
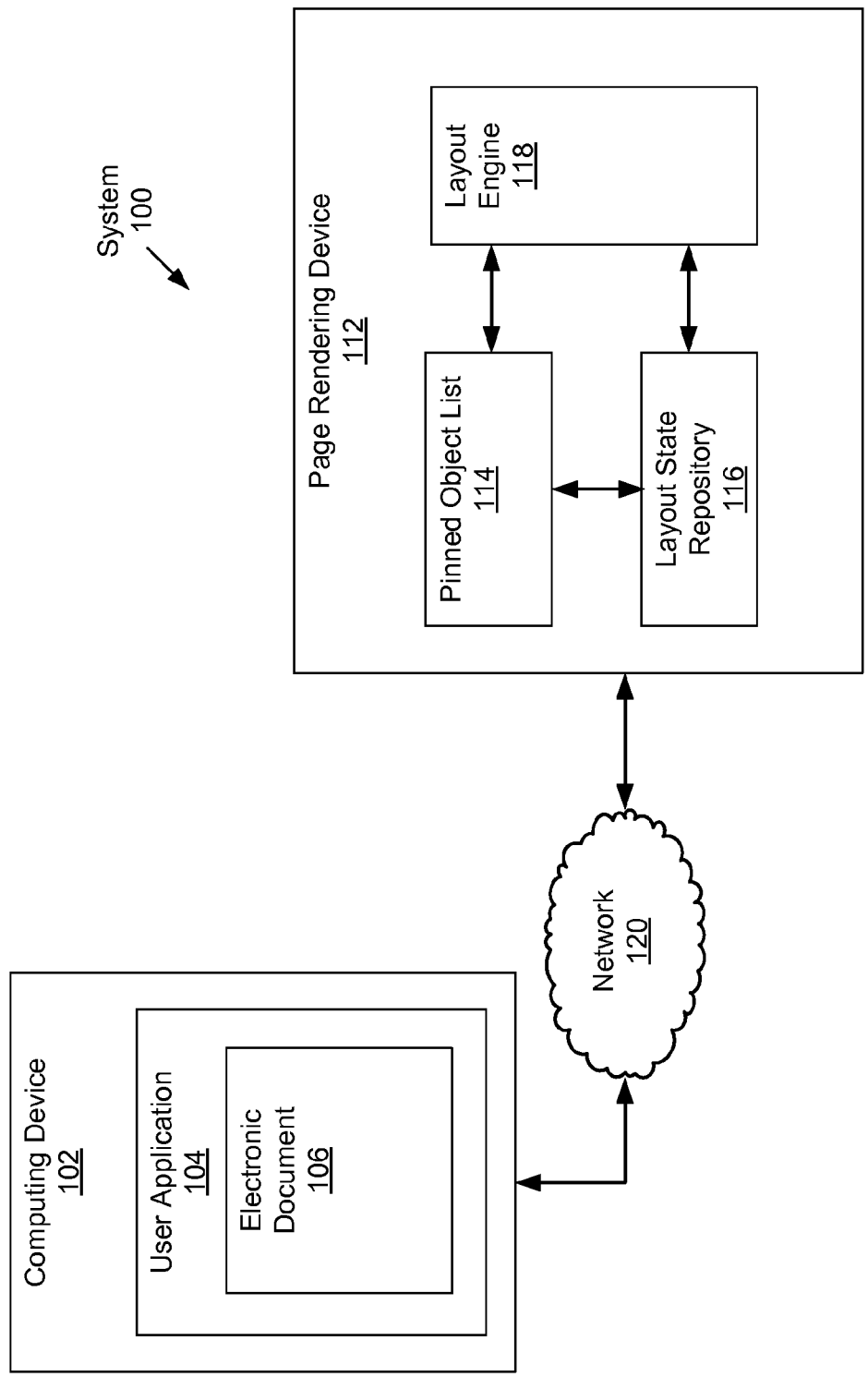
FIG. 1 shows a block diagram depicting a system in accordance in with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for rendering a page having one or more text streams, one or more graphical objects (e.g., images, photographs, drawings, etc.), and one or more anchors specifying the displacements of their corresponding graphical object(s). Specifically, embodiments of the invention may be used to position graphical objects within previously formatted text on a page of an ED. More specifically, once a graphical object having a negative displacement is positioned on the page, the graphical object is marked as pinned, and the layout of the page is restarted. During the subsequent layout, text is placed around the pinned graphical object(s) (i.e., text is wrapped around the graphical objects) and the anchors corresponding to the pinned graphical objects are effectively ignored (i.e., deemed inactive).

FIG. 1 shows a system (100) in accordance with one or more embodiments of the invention. As shown in FIG. 1, the system (100) has multiple components including a page rendering device (PRD) (112) and a computing device (102). The PRD (112) may be a printer, an electronic reader, etc. The computing device (102) may be a personal computer (PC), a desktop computer, a mainframe, a server, a telephone, a kiosk, a cable box, a personal digital assistant (PDA), an electronic reader, a mobile phone, a smart phone, etc. There may be a direct connection (e.g., universal serial bus (USB) connection) between the computing device (102) and the PRD (112). Alternatively, the computing device (102) and the PRD (112) may be connected using a network (120) having wired and/or wireless segments.

In one or more embodiments of the invention, the PRD (112) is located on the computing device (102). In such embodiments, the PRD (112) may correspond to any combination of hardware and software on the computing device (102) for rendering an ED.

In one or more embodiments of the invention, the computing device (102) executes the user application (104). The user application (104) is a software application operated by a user and configured to obtain, input, generate, display, and/or print an ED (e.g., Electronic Document (106)) having any number of pages. Accordingly, the user application (104) may be a word-processing application, a spreadsheet application, a desktop publishing application, a graphics application, a photograph printing application, an Internet browser, etc. The user application (104) may generate new EDs and/or obtain previously saved EDs.

In one or more embodiments of the invention, the ED (106) includes one or more text streams. A text stream may correspond to a title, a subtitle, a sentence, a paragraph, a chapter, etc. Accordingly, a text stream may have any number of characters. Further, the ED (106) may also include font(s) and font size(s) for each text stream. In other words, the ED (106) specifies the font(s) and font size(s) in which the characters of the text stream(s) should be displayed or printed.

In one or more embodiments of the invention, the ED (106) includes any number of graphical objects (e.g., clipart, photographs, drawings, etc.). The ED (106) may also include anchors for positioning the one or more graphical objects. Specifically, each anchor corresponds to a graphical object, and each anchor dictates the position (i.e., displacement) of its graphical object relative to itself. Anchors may be specified before, after, or within text streams, and like text characters, anchors are positioned on a page during a rendering of the ED (106). However, unlike text characters, anchors are generally not visible when the ED (106) is displayed and/or printed, and text and/or graphics may be placed on top of the anchor. Once an anchor is placed on the page, the position of the anchor's graphical object may be calculated based on the displacement specified by the anchor.

In one or more embodiments of the invention, the ED (106) is represented/defined using a document markup language (e.g., ODF, OOXML, etc.). Accordingly, the text stream(s), the layout parameters of the text stream(s) (e.g., characters, fonts, font sizes, etc.), the anchors, and the graphical objects in the ED (106) may be recorded as attributes within the tags of the document markup language. Moreover, these attributes are needed to correctly render the ED (106) for display or printing.

In one or more embodiments of the invention, the PRD (112) includes a pinned object list (114). The pinned object list (114) is a list of graphical objects in the ED (106) that are marked (i.e., designated) as pinned (described below). Specifically, the pinned object list (114) may be a table having a number of entries, where each entry identifies/references a pinned graphical object on the page. A graphical object that is not identified/referenced by an entry in the pinned object list (114) for the page may be considered unmarked and thus not pinned. In one or more embodiments of the invention, one or more entries (i.e., graphical objects) in the pinned object list (114) are removed when a page is rendered.

In one or more embodiments of the invention, the PRD (112) also includes a layout state repository (116). The layout state repository (116) records the layout state of a page. Specifically, the layout state repository (116) stores the one or more layout parameters that define the layout state of the page. Example layout parameters include, but are not limited to, a starting text position, a file pointer within the ED (106), font characteristics (e.g., font size, font style, bold, italics, underline), margins, a number of columns on a page, and a bounding box, etc. The layout state repository (116) may store the initial layout state (i.e., the state of each layout parameter) for a page before any text (i.e., characters), anchors, or graphical objects are placed on the page.

In one or more embodiments of the invention, the layout engine (118) is configured to render the ED (106) for viewing and/or printing. In other words, the layout engine (118) is configured to place elements (e.g., text, graphical objects) of the ED (106) on the pages according the layout state(s) of the pages. Specifically, the layout engine (118) is configured to calculate the positions (i.e., coordinates) of the text characters on one or more pages, calculate the positions of the anchors on one or more pages, and calculate the positions of the graphical objects on one or more pages. The layout engine (118) is further configured to identify the end of a page and partition one or more text stream(s) of the ED (106) for placement across multiple pages.

In one or more embodiments of the invention, the layout engine (118) is configured to identify any graphical objects that are positioned (e.g., as a result of anchors with negative displacements) within regions of a page in which text and/or graphical objects have already been placed. Further, the layout engine (118) is configured to mark (i.e., designate) such graphical objects as pinned and place the characters of the text stream around the pinned objects (i.e., wrap a portion of the text stream around the pinned graphical object). Further still, the layout engine (118) is configured to ignore anchors (i.e., deem the anchors inactive) encountered corresponding to already pinned graphical objects on the page.

Those skilled in the art, having the benefit of this detailed description, will appreciate that the layout engine (118) is configured to send information to, and receive information from, the pinned object list (114) and the layout state repository (116).

Figure 2:
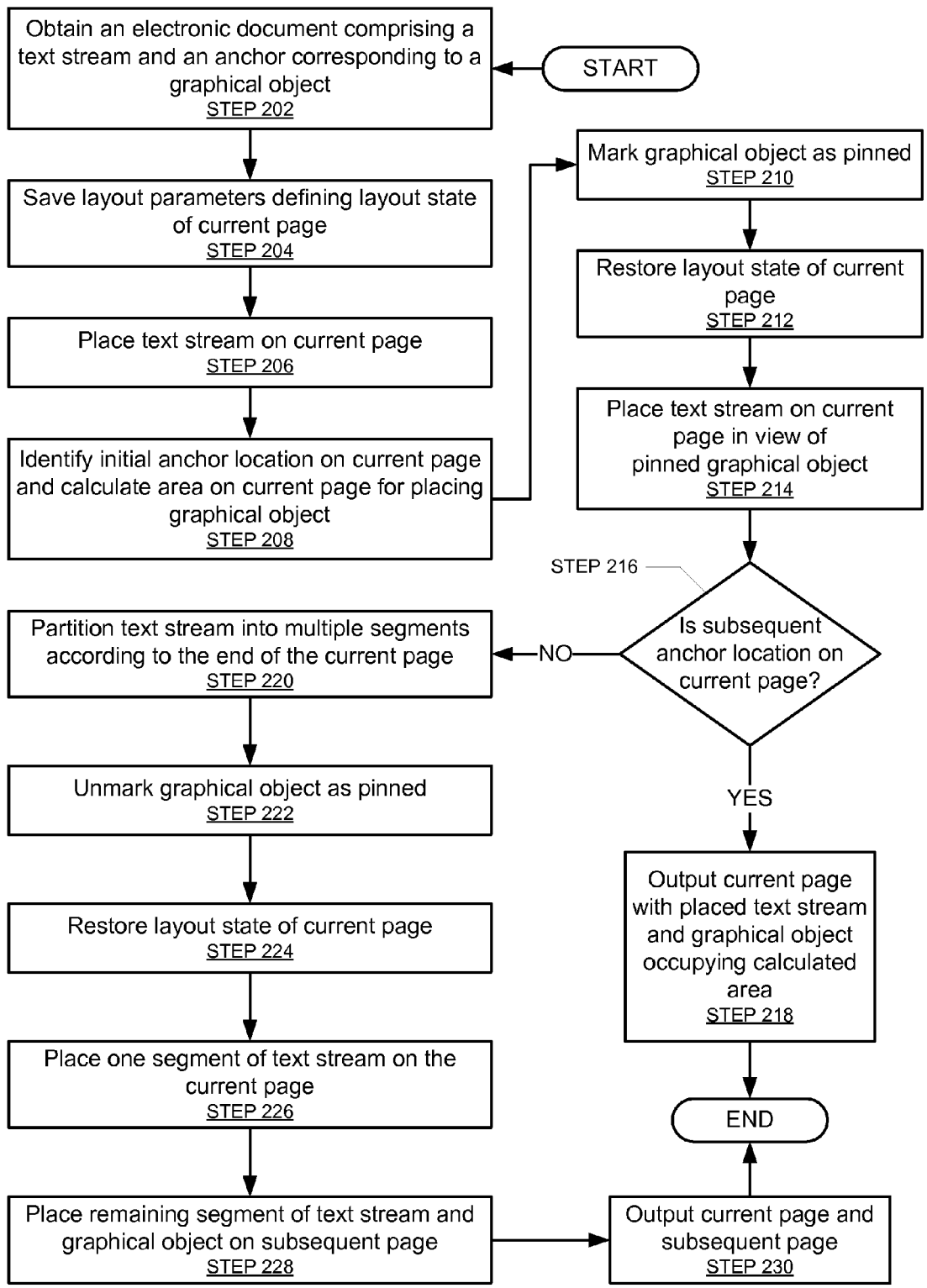
FIG. 2 shows a flowchart in accordance with one or more embodiments of the invention.

FIG. 2 shows a flowchart for rendering one or more pages of an ED in accordance with one or more embodiments of the invention. The process depicted in FIG. 2 may be implemented using one or more of the components in the system (100) (e.g., Layout Engine (118)), described above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, an ED is obtained (STEP 202). In one or more embodiments of the invention, the ED includes a text stream and one or more graphical objects. Each graphical object may include a corresponding anchor. The anchor may specify a displacement of the graphical object on the page relative to the anchor. As discussed above, the anchor may be specified before, after, or within text streams. As also discussed above, the text stream may be of any size and thus have any number of characters. In one or more embodiments of the invention, the ED is represented/defined using a document markup language (e.g., ODF, OOXML, etc.). Accordingly, the text stream(s), the layout parameters of the text stream(s) (e.g., characters, fonts, font sizes, etc.), the anchors, and the graphical objects in the ED may be recorded within the tags of the document markup language. The ED may be obtained by a page rendering device along with a request to render the ED.

In STEP 204, the layout parameters defining the layout state of the current page are saved. Example layout parameters include, but are not limited to, a starting text position, a file pointer within the ED, font characteristics (e.g., font size, font style, bold, italics, underline), margins, a number of columns on a page, and a bounding box, etc. The layout parameters may be saved automatically before starting an initial layout of the page.

In STEP 206, the text stream is placed on the current page. In other words, a layout of the current page begins. In one or more embodiments of the invention, the text stream is placed on the current page according to the layout parameters. For example, a layout parameter may be to start placing text in the upper left corner of the page, continue across in a row to the far margin or edge of the page, continue on the subsequent row, and continue until the last row on the page.

As discussed above, anchors may be specified before, after, or within text streams, and like text characters, anchors are positioned on a page during a rendering of the ED. In STEP 208, as the text stream is placed on the current page, an initial location for an anchor is identified (i.e., initial anchor location). As also discussed above, the anchor specifies a displacement for its corresponding graphical object. Once the initial location for the anchor is identified, an area on the current page for placing the graphical object is calculated based on the displacement. In the case of a negative displacement, the calculated area for the graphical object may be located further up the page relative to the anchor. The area is effectively the footprint of the graphical object on the page.

In one or more embodiments of the invention, if the area on the page does not overlap with the text stream on the page (i.e., the calculated area is located in vacant/empty region of the page in which no text or other graphics have been placed), then the text stream continues to be placed, and the graphical object is free to occupy the area. In other words, in such a case, the text stream does not need to be re-placed (or reflowed) to accommodate the graphical object.

In STEP 210, the graphical object is marked as pinned. Pinning the graphical object may affix the graphical object to the location on the page. The graphical object may be marked or designated as pinned in response to the calculated area overlapping a region in which text and/or other graphical objects have already been placed. In one or more embodiments of the invention, when the graphical object is marked as pinned, the graphical object is added to a list of pinned objects for the page of the ED. The list of pinned objects for the page may be a table, where each entry in the table corresponds to graphical object that is marked or designated as pinned.

In STEP 212, the layout state of the current page is restored. The layout state of the current page may be restored using the layout parameters that were saved in STEP 204, described above. In one or more embodiments of the invention, the layout state of the current page is restored in preparation for re-placing the text stream in a subsequent layout of the page.

In STEP 214, the text stream is placed on the page in view of the pinned graphical object. In other words, the text stream is wrapped around the area on the page that corresponds to the graphical object so that there is no overlap between the text stream and the graphical object. Those skilled in the art, having the benefit of this detailed description, will appreciate that because the text stream is now being wrapped around the area, the anchor is either moved further down the current page to a different location or, depending on the magnitude of the area and/or the proximity of the initial anchor location to the end of the current page, pushed onto a subsequent page. Regardless, the new location of the anchor is referred to as the subsequent anchor location.

In STEP 216, a determination is made as to whether the subsequent location of the anchor is on the current page of the ED. When it is determined that the subsequent anchor location and the initial anchor location are on the current page, the process proceeds to STEP 218. When it is determined that the subsequent anchor location and the initial anchor location are on different pages, the process proceeds to STEP 220. Those skilled in the art, having the benefit of this detailed description, will appreciate that the subsequent anchor location and the initial anchor location are on different pages if the end of the current page is reached before the anchor is encountered.

When it is determined that the subsequent anchor location and the initial anchor location are on the current page, the characters of the text stream(s) continue to be placed on the current page until the end of the current page is reached. Further, the graphical object that is pinned may be removed from the list of pinned objects for the current page of the ED when the end of the current page is reached.

In STEP 218, the current page is output with the graphical object occupying the calculated area, and with a portion of the text stream wrapped around the graphical object, even though the displacement between the calculated area and the subsequent anchor location does not conform to the displacement specified by the anchor. In other words, by pinning the graphical object, the corresponding anchor is deemed inactive and is effectively ignored.

Alternatively, when it is determined that subsequent anchor location and the initial anchor location are on different pages, the text stream is partitioned into multiple segments according to the end of the current page (STEP 220). In such scenarios, the first segment of the text stream may correspond to the portion of the text stream already placed on the current page, and the second segment of the text stream may correspond to the remainder of the text stream (i.e., the portion of the text stream that was not placed on the current page because the end of the current page was reached).

In STEP 222, the graphical object is unmarked as pinned. Unmarking the graphical object as pinned may include removing an entry in the list of pinned objects corresponding to the graphical object. In STEP 224, the layout state of the current page is restored. By performing this STEP 224, the current page may be laid out without consideration of the graphical object, which has been moved to the subsequent page.

In STEP 226, the first segment of the text stream is placed on the current page. As discussed above, since the graphical object is no longer pinned on the current page, the first segment of the text stream may be placed on the current page without consideration of the graphical object.

In STEP 228, the second segment of the text stream including the anchor and the graphical object are placed on the subsequent page. In such a case, the subsequent page may be laid out in a manner described above with respect to one or more of STEPS 202-228 described above. Those skilled in the art, having the benefit of this detailed description, will appreciate that by placing only the first segment of the text stream on the current page and forcing the second segment of the text stream on a subsequent page, a blank region (i.e., a region void of text) may result towards the end of the current page.

In STEP 230, the current page and the subsequent page(s) are output. After STEP 230 is completed, the process ends.

Although the steps of FIG. 2 focus on the existence of one text stream and one graphical object, the ED may have any number of text streams and/or graphical objects spread across any number of pages. Accordingly, one or more of the steps in FIG. 2 may be repeated to handle the multiple text streams and/or graphical objects of the ED.

In one or more alternative embodiments of the invention, as the text stream is being placed on the current page in view of the pinned graphical object (STEP 214), the text stream will continue to be placed until the anchor is encountered, even if a physical boundary of the page (e.g., end of the page) is encountered first. This may involve adding a virtual extension to the page beyond the physical boundary, on which portions of the text stream and, eventually, the anchor will be placed. In such embodiments, in response to the subsequent anchor location being within the virtual extension (i.e., beyond the physical boundary of the page), the anchor is deemed inactive, and the ignored anchor and all text placed within the virtual extension are transferred to the start of the subsequent page. However, any text placed on the current page remains on the current page.

Figures 3C, 3D:
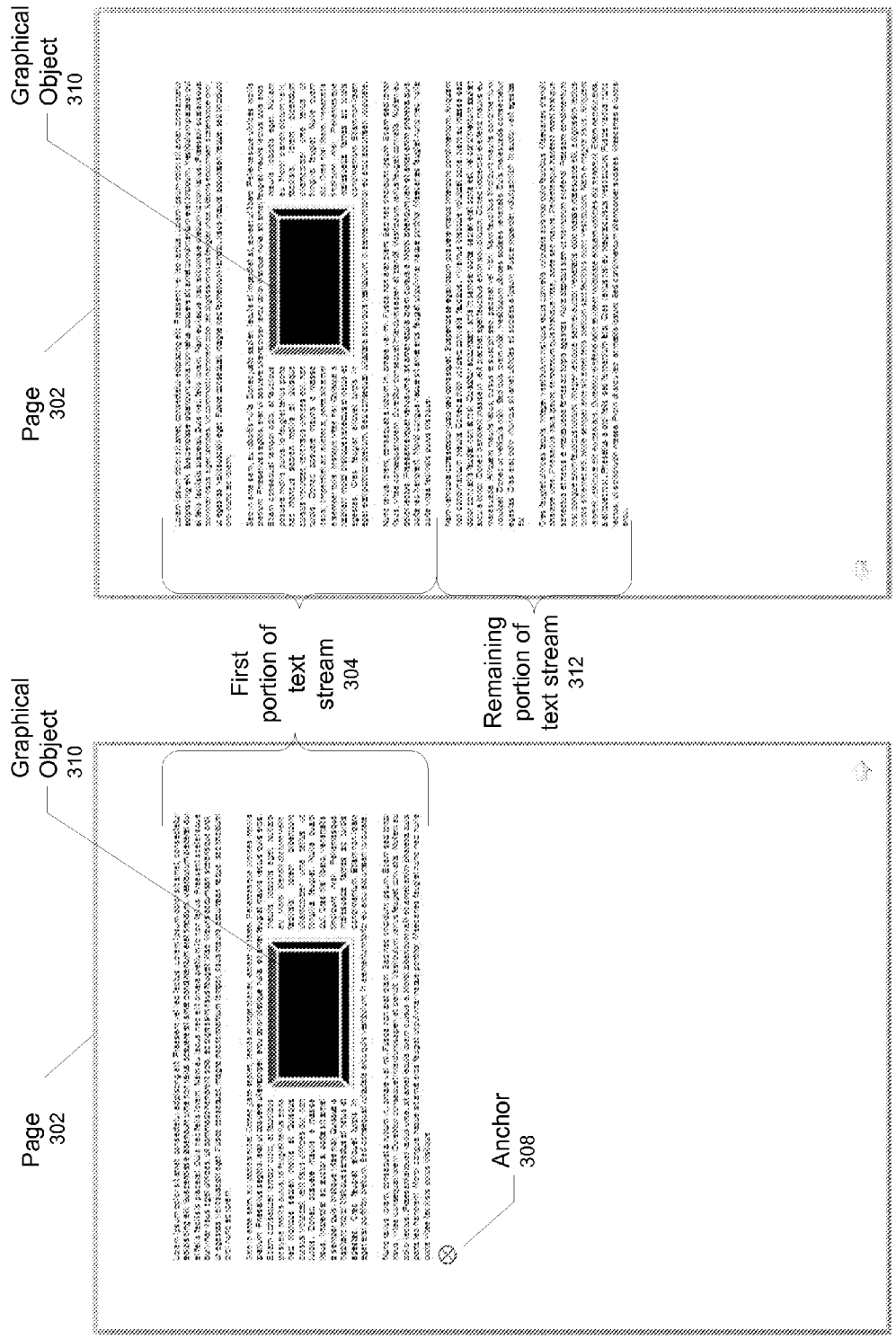
FIGS. 3A through 4D show examples in accordance with one or more embodiments of the invention.

FIGS. 3A-3D show an example in accordance with one or more embodiments of the invention. The example of FIGS. 3A-3D is related to the process shown in FIG. 2. Specifically, FIG. 3A shows a blank page (302) before any text or graphics identified by an ED are placed on the page (302).

In FIG. 3B, a first layout of the page (302) has been initiated. As shown in FIG. 3B, a portion of a text steam (304) has been placed on the page. During placement of the text stream, the anchor (308) is encountered and the initial anchor position on the page (302) is identified. As discussed above, the anchor (308) corresponds to a graphical object and the anchor (308) specifies the displacement (399) of the graphical object relative to the anchor's position on the page (308) (i.e., initial anchor position). Those skilled in the art, having the benefit of this detailed description, will appreciate that the graphical object will occupy an area (306) on the page (i.e., the area is effectively the footprint of the graphical object). The displacement (399) specified by the anchor may correspond to the distance and direction of a corner or center of the area (306) with respect to the initial anchor position.

As shown in FIG. 3B, the area (306) overlaps with a region on the page (302) in which text has already been placed. In response, the graphical object is marked as pinned (i.e., an entry referencing the graphical object is inserted into a pinned object list), the layout state of the page (302) is restored, and a second layout of the page (302) is initiated.

FIG. 3C shows the page (302) during the second layout. As shown in FIG. 3C, the first portion of the text stream (304) has been wrapped around the area occupied by the graphical object (310). Similar to FIG. 3B, when the anchor (308) is encountered after the first portion of the text steam (304) has been placed, the location of the anchor (i.e., subsequent anchor location) on the page (302) is identified. As shown in FIG. 3C, as a result of wrapping the first portion of the text stream (304), the subsequent location of the anchor (308) is further down the page with respect to the initial anchor location. However, because the graphical object (310) corresponding to the anchor (308) is marked as pinned, the anchor (308) is effectively ignored, and the graphical object (310) remains in its position even though the displacement between the pinned graphical object and the subsequent anchor position does not match the displacement (399) specified by the anchor (308).

In FIG. 3D, after the anchor is identified and ignored during the second layout, the remaining portion of the text stream (312) is placed on the page (302) and the page (302) is output.

FIGS. 4A-4D show an example in accordance with one or more embodiments of the invention. The example of FIGS. 4A-4D is related to the process shown in FIG. 2. The ED in this example includes two graphical objects, each having its own anchor, and a text stream.

FIG. 4A shows a current page (402) of the ED during a first layout. As shown in FIG. 4A, a portion of a text steam (404) has been placed on the current page (402). During placement of the text stream (404), the anchor (412) is encountered and the initial anchor position on the current page (402) is identified. As discussed above, the anchor (412) corresponds to a graphical object and the anchor (412) specifies the displacement (499) of the graphical object relative to the anchor's position on the current page (402) (i.e., initial anchor position). Those skilled in the art, having the benefit of this detailed description, will appreciate that the graphical object will occupy an area (408) on the current page (i.e., the area (408) is effectively the footprint of the graphical object). The displacement (499) specified by the anchor may correspond to the distance and direction of the center of the area (408) with respect to the initial anchor position.

As shown in FIG. 4A, the area (408) overlaps with a region on the current page (402) in which text has already been placed. In response, the graphical object is marked as pinned (i.e., an entry referencing the graphical object is inserted into a pinned object list for the current page (402)), the layout state of the current page (402) is restored, and a second layout of the current page (402) is initiated.

FIG. 4B shows the current page (402) during the second layout. As shown in FIG. 4B, the text stream (404) is wrapped around the area (408) occupied by the graphical object (418). However, as also shown in FIG. 4B, the end of the current page (402) is reached without encountering the anchor (412). In other words, by placing the graphical object (418) on the current page (402), and wrapping at least a portion of the text stream (404) around the area (408) corresponding to the graphical object (418), the anchor (412) has been pushed off the current page (402) onto a subsequent page (not shown). Accordingly, the initial anchor location and the subsequent anchor location are not on the same page. In response to the initial anchor location and the subsequent anchor location not being on the same page, the text stream is partitioned into two segments: segment A (406), which includes the text of the text stream (404) placed on the current page (402); and segment B (not shown), which includes the text of the text stream (404) not placed on the current page (402) (i.e., because the end of current page was reached). In further response to the initial anchor location and the subsequent anchor location not being on the same page, the graphical object is unmarked as pinned (i.e., the entry referencing the graphical object is removed from the list of pinned objects for the current page (402)), the layout state of the current page (402) is restored, and a third layout of the current page (402) is initiated.

Figure 4C:
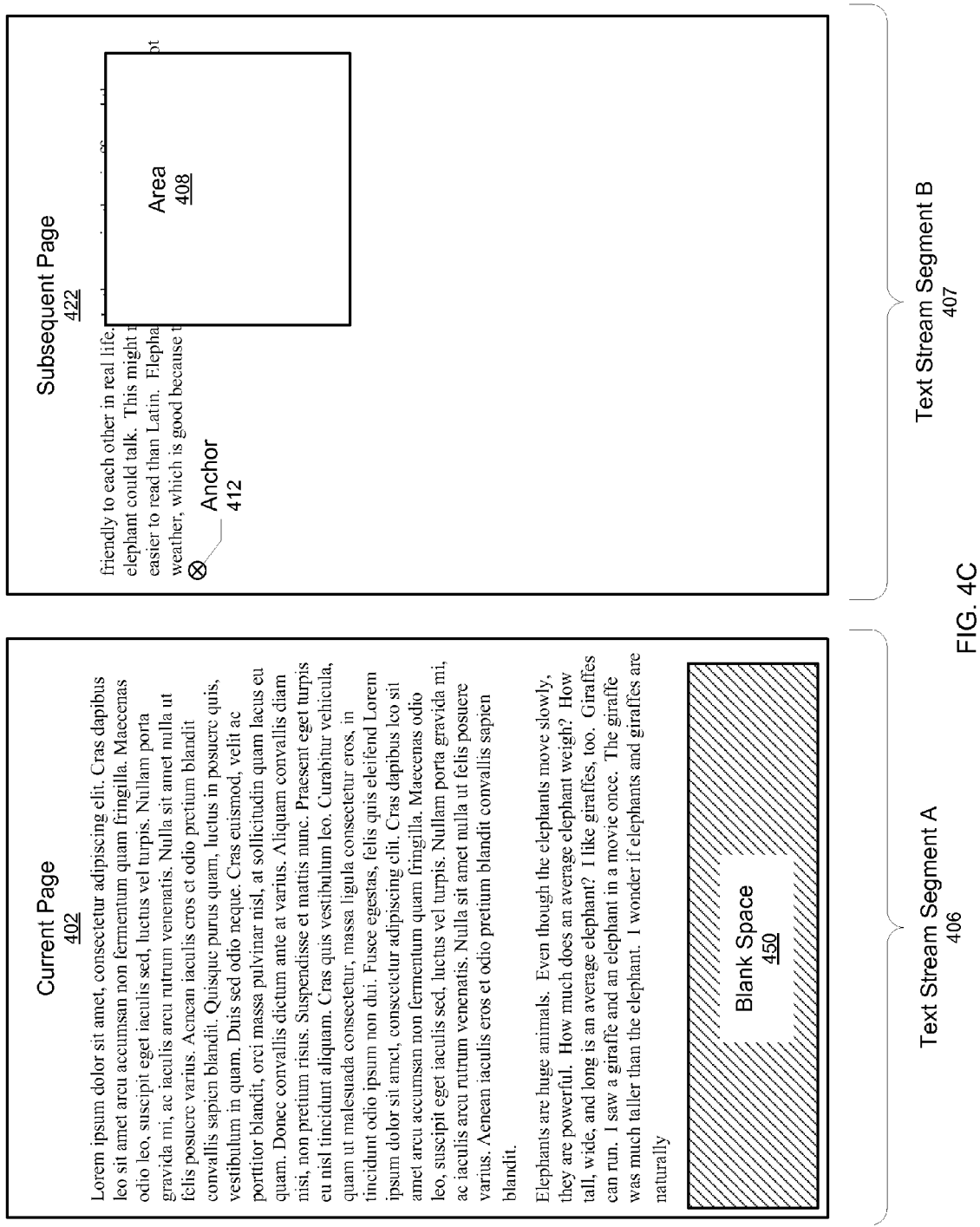

FIG. 4C shows the current page (402) following the third layout. As shown in FIG. 4C, text stream segment A (406) is placed on the current page (402). However, because text stream segment A (406) does not need to wrap around the area (408) corresponding to the graphical object (418) (i.e., the graphical object (418) is no longer pinned on the current page (402)), text stream segment A (406) finishes before the end of the current page (402) is reached, leaving blank space (450).

FIG. 4C also shows the subsequent page (422). As shown in FIG. 4C, text stream segment B (407) is placed on the subsequent page (422). During placement of text stream segment B (407), the anchor (412) is encountered and the initial anchor position on the subsequent page (422) is identified. As shown in FIG. 4C, the area (408) overlaps with a region on the subsequent page (422) in which text has already been placed. In response, the graphical object is marked as pinned (i.e., an entry referencing the graphical object is inserted into a pinned object list for the subsequent page (422)), the layout state of the subsequent page (422) is restored, and a second layout of the subsequent page (422) is initiated.

Figure 4D:
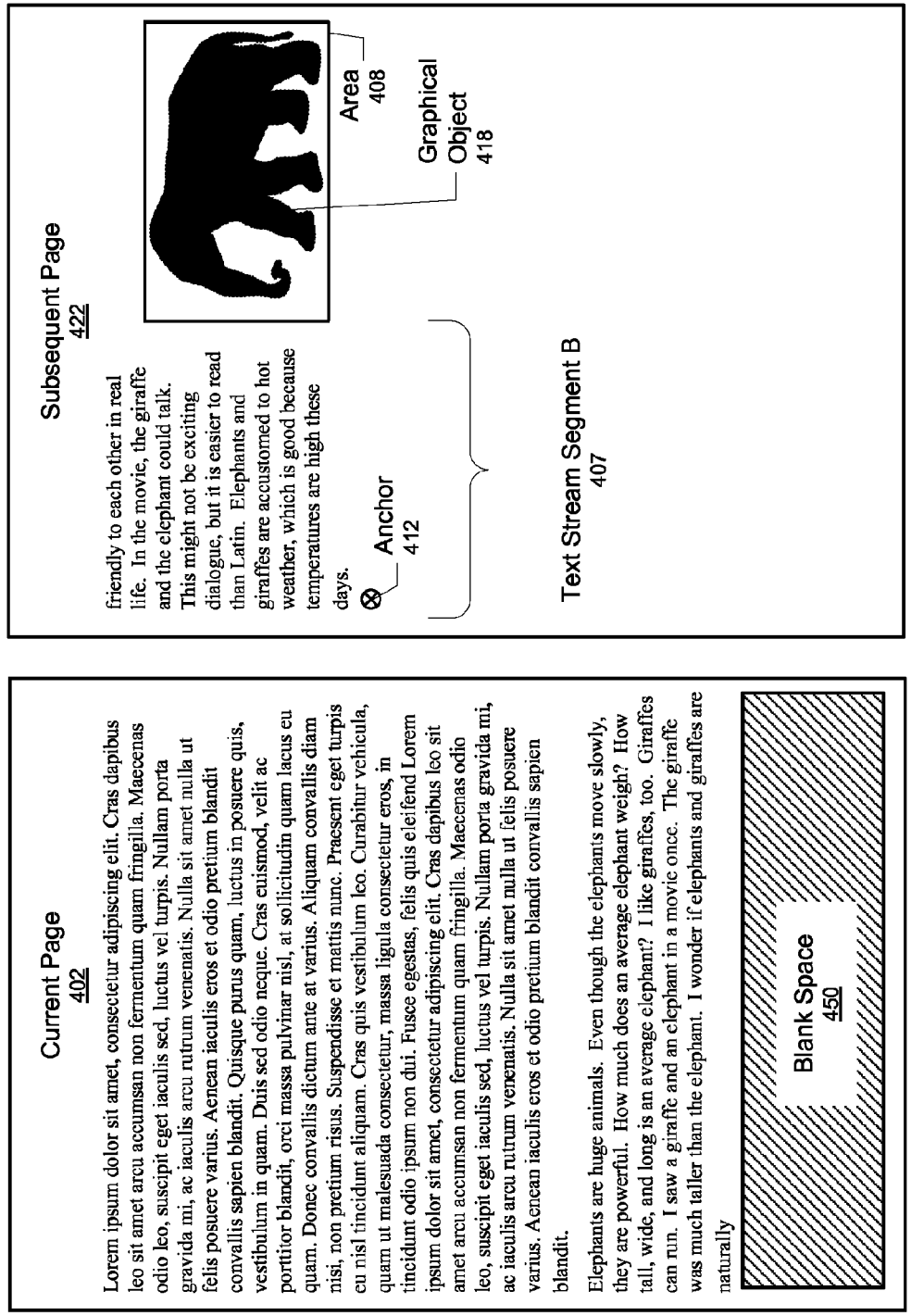

FIG. 4D shows the subsequent page (422) during the second layout. As shown in FIG. 4D, at least a portion of text stream segment B (407) has been wrapped around the area (408) occupied by the graphical object (418). Similar to FIG. 4C, when the anchor (412) is encountered after text steam segment B (407) has been placed, the location of the anchor (412) (i.e., subsequent anchor location) on the subsequent page (422) is identified. As shown in FIG. 4D, as a result of wrapping text stream segment B (407), the subsequent location of the anchor (412) is further down the subsequent page (422) with respect to the initial anchor location. However, because the graphical object (418) corresponding to the anchor (412) is marked as pinned, the anchor (412) is effectively ignored, and the graphical object (418) remains in its position even though the displacement between the pinned graphical object and the subsequent anchor position does not match the displacement (499) specified by the anchor (412).

Figure 5:
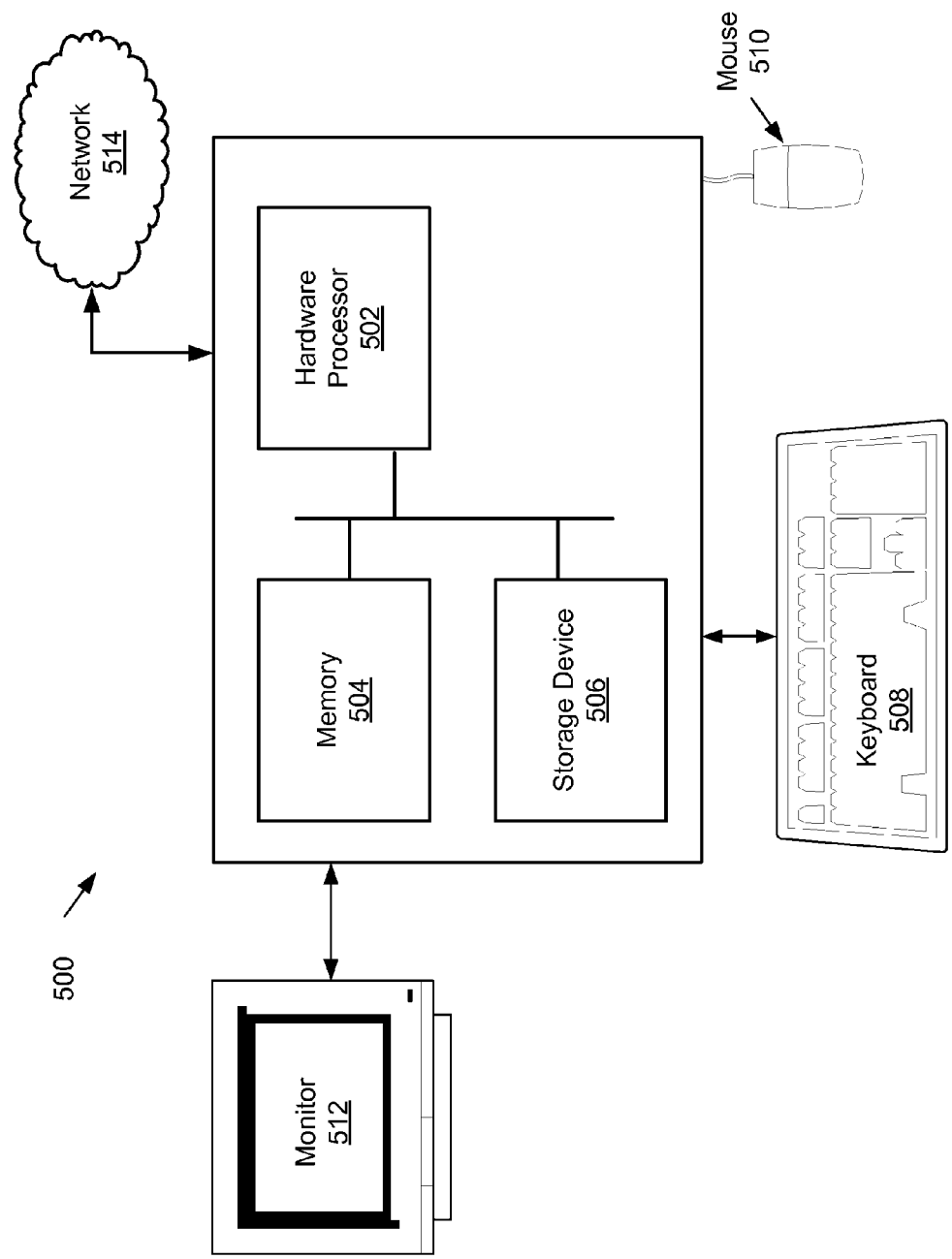
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more hardware processor(s) (502) (such as a central processing unit (CPU), integrated circuit, etc.), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms, now known or later developed. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a tape, a hard drive, punch cards, memory, or any other tangible computer readable storage device.

Current methods to reflow text to wrap a text stream around a graphical object with a negative displacement may present problems. Specifically, when positioning a graphical object is dependent upon the position of an anchor point that occurs later in the page than the graphical object, the position of the anchor point itself can be affected by the reflowing of the text stream. If so, then the position of the graphical object is again affected. The iteration of reflowing a text stream around the graphical object may create a divergent condition. Reflowing a text stream using conventional methods may be repeated a number of times, even forming an infinite loop. Such conventional methods are inefficient from a processing standpoint.

Embodiments of the invention restrict cases in which reflow of a text stream occur. Consequently, a divergent condition may be avoided. Further, using embodiments of the invention allows for more consistent rendering of an ED. Processing efficiency is also improved using embodiments of the invention, as the amount of iteration to reflow a text stream and reposition a graphical object with a negative anchor displacement on a page is reduced. Consequently, processing efficiency and consistency in page rendering is increased.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method for rendering a page, comprising:
obtaining, before outputting the page, an electronic document comprising a text stream and an anchor corresponding to a graphical object and specifying a first displacement of the graphical object relative to the anchor;
placing, during a first layout of a page and before outputting the page, the text stream and the anchor within a region of the page;

identifying, during the first layout and before outputting the page, a first location on the page corresponding to the anchor;

calculating, before outputting the page and based on the first location and the first displacement, an area on the page for placing the graphical object;

marking, during the first layout and in response to the region overlapping the area, the graphical object as pinned before outputting the page;

initiating, in response to the region overlapping the area and before outputting the page, a second layout of the page;

placing, during the second layout and before outputting the page, the text stream and the anchor on the page by wrapping a portion of the text stream around the area;

identifying, during the second layout and before outputting the page, a second location on the page corresponding to the anchor, wherein the second position and the area are separated by a second displacement distinct from the first displacement; and outputting, in response to identifying the second location and in response to marking the graphical object as pinned, the page for at least one selected from a group consisting of display and printing, the page comprising at least the portion of the text stream and with the graphical object occupying the area.

2. The method of claim 1, further comprising:

saving, before placing the text stream within the region, a plurality of layout parameters defining a layout state of the page, wherein initiating the second layout comprises restoring the layout state of the page defined by the plurality of layout parameters.

3. The method of claim 2, wherein the plurality of layout parameters comprises at least one selected from a group consisting of a starting position of the text stream, a font characteristic, a margin, and a number of columns on the page.

4. The method of claim 1, further comprising:

deactivating the anchor in response to the second location being past a physical boundary of the page.

5. The method of claim 1, wherein marking the graphical object as pinned comprises:

adding an entry referencing the graphical object into a table of pinned objects.

6. A method for rendering a plurality of pages including a first page and a second page, comprising:

obtaining, before outputting the first page and the second page, an electronic document comprising a text stream and an anchor corresponding to a graphical object and specifying a displacement of the graphical object relative to the anchor;

placing, during a first layout of the first page and before outputting the first page and the second page, the text stream and the anchor within a region of the first page;

identifying, during the first layout and before outputting the first page and the second page, a location on the first page corresponding to the anchor;

calculating, before outputting the first page and the second page and based on the location and the displacement, an area on the first page for placing the graphical object;

marking, before outputting the first page and the second page and in response to the region overlapping the area, the graphical object as pinned;

initiating, in response to the region overlapping the area and before outputting the first page and the second page, a second layout of the first page;

placing, during the second layout and before outputting the first page and the second page, the text stream on the first page by wrapping a portion of the text stream around the area;

identifying, before encountering the anchor during the second layout and before outputting the first page and the second page, an end of the first page and a position within the text stream corresponding to the end of the first page;

unmarking, in response to identifying the end of the first page before the anchor is encountered, the graphical object as pinned;

partitioning, in response to identifying the end of the first page before the anchor is encountered, the text stream into a first segment and a second segment defined by the position;

initiating, in response to identifying the end of the first page before the anchor is encountered, a third layout of the first page;

placing, during the third layout, the first segment on the first page;

placing, after the third layout, the second segment, the anchor, and the graphical object on the second page; and outputting the first page having the first segment and the second page having the second segment and the graphical object for at least one selected from a group consisting of display and printing.

7. The method of claim 6, further comprising:

saving, before placing the text stream within the region, a plurality of layout parameters defining a layout state of the page, wherein initiating the second layout comprises restoring the layout state of the page defined by the plurality of layout parameters, and wherein initiating the third layout comprises restoring the layout state of the page defined by the plurality of layout parameters.

8. The method of claim 7, wherein the plurality of layout parameters comprises at least one selected from a group consisting of a starting position of the text stream, a font characteristic, a margin, and a number of columns on the page.

9. A system for rendering a page, comprising:

a hardware processor; and a layout engine executing on the hardware processor and configured to:

obtain, before the page is output, an electronic document comprising a text stream and an anchor corresponding to a graphical object and specifying a first displacement of the graphical object relative to the anchor;

place, during a first layout of the page and before the page is output, the text stream and the anchor within a region of the page;

identify, during the first layout and before the page is output, a location on the page corresponding to the anchor;

calculate, before the page is output and based on the location and the displacement, an area on the page for placing the graphical object;

mark, during the first layout and in response to the region overlapping the area, the graphical object as pinned before the page is output;

initiate, before the page is output and in response to the region overlapping the area, a second layout of the page;

place, during the second layout and before the page is output, the text stream and the anchor on the page by wrapping a portion of the text stream around the area;

identify, during the second layout and before the page is output, a second location on the page corresponding to the anchor, wherein the second position and the area are separated by a second displacement distinct from the first displacement; and output, in response to identifying the second location and in response to marking the graphical object as pinned, the page for at least one selected from a group consisting of display and printing, the page comprising at least the portion of the text stream and with the graphical object occupying the area.

10. The system of claim 9, further comprising:
a pinned object list operatively connected to the layout engine and configured to store, in response to the graphical object being marked as pinned, an entry referencing the graphical object.

11. The system of claim 9, further comprising:
a layout state repository executing on the hardware processor and operatively connected to the layout engine.

12. The system of claim 11, wherein the layout engine is further configured to:
save, before placing the text stream within the region, a plurality of layout parameters defining a layout state of the page in the layout state repository,
wherein initiating the second layout comprises restoring the layout state of the page defined by the plurality of layout parameters.

13. The system of claim 12, wherein the plurality of layout parameters comprises at least one selected from a group consisting of a starting position of the text stream, a font characteristic, a margin, and a number of columns on the page.

14. The system of claim 9, wherein the layout engine is further configured to:
deactivate the anchor in response to the second location being past a physical boundary of the page.

15. The system of claim 9, wherein the layout engine and the hardware processor are located on a printer.

16. A non-transitory computer readable medium storing computer readable program code embodied therein for performing a method of rendering a page, the method comprising:
obtaining, before outputting the page, an electronic document comprising a text stream and an anchor corresponding to a graphical object and specifying a first displacement of the graphical object relative to the anchor;
placing, during a first layout of the page and before outputting the page, the text stream and the anchor within a region of the page;
identifying, during the first layout and before outputting the page, a first location on the page corresponding to the anchor;
calculating, before outputting the page and based on the first location and the first displacement, an area on the page for placing the graphical object;
marking, during the first layout and in response to the region overlapping the area, the graphical object as pinned before outputting the page;
initiating, in response to the region overlapping the area and before outputting the page, a second layout of the page;
placing, during the second layout and before outputting the page, the text stream and the anchor on the page by wrapping a portion of the text stream around the area;
identifying, during the second layout and before outputting the page, a second location on the page corresponding to the anchor, wherein the second position and the area are separated by a second displacement distinct from the first displacement; and
outputting, in response to identifying the second location and in response to marking the graphical object as pinned, the page for at least one selected from a group consisting of display and printing, the page comprising at least the portion of the text stream and with the graphical object occupying the area.

17. The non-transitory computer readable medium of claim 16, the method further comprising:
saving, before placing the text stream within the region, a plurality of layout parameters defining a layout state of the page,
wherein initiating the second layout comprises restoring the layout state of the page defined by the plurality of layout parameters.

18. The non-transitory computer readable medium of claim 17, wherein the plurality of layout parameters comprises at least one selected from a group consisting of a starting position of the text stream, a font characteristic, a margin, and a number of columns on the page.

19. The non-transitory computer readable medium of claim 16, the method further comprising:
deactivating the anchor in response to the second location being past a physical boundary of the page.

20. The non-transitory computer readable medium of claim 16, wherein marking the graphical object as pinned comprises:
adding an entry referencing the graphical object into a table of pinned objects.

* * * * *